(12) United States Patent
Tokuyama

(10) Patent No.: US 6,205,445 B1
(45) Date of Patent: *Mar. 20, 2001

(54) FILE DISTRIBUTION SYSTEM AND METHOD THEREOF

(75) Inventor: Hiroko Tokuyama, Kobe (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/275,455

(22) Filed: Mar. 24, 1999

(30) Foreign Application Priority Data

Mar. 27, 1998 (JP) .................................. 10-080845

(51) Int. Cl.$^7$ ...................................... G06F 17/30
(52) U.S. Cl. ........................... 707/10; 707/203; 707/511; 709/202; 709/203; 709/224; 709/227; 709/229
(58) Field of Search .................................. 707/511, 203, 707/10; 395/703; 709/203, 202, 224, 227, 229

(56) References Cited

U.S. PATENT DOCUMENTS

| | | | |
|---|---|---|---|
| 5,428,782 | * | 6/1995 | White ................................. 709/101 |
| 5,586,254 | * | 12/1996 | Kondo et al. ...................... 395/200.1 |
| 5,729,744 | * | 3/1998 | Gerken et al. ......................... 707/203 |
| 5,835,911 | * | 11/1998 | Nakagawa et al. ................... 707/203 |
| 5,841,927 | * | 11/1998 | Watanabe et al. .................... 385/129 |
| 5,854,978 | * | 12/1998 | Heidari ................................ 455/418 |
| 5,867,714 | * | 2/1999 | Todd et al. ............................ 395/712 |
| 5,870,724 | * | 2/1999 | Lawlor et al. .......................... 705/42 |
| 5,905,984 | * | 5/1999 | Thorsen .................................. 707/9 |

FOREIGN PATENT DOCUMENTS 10-27094   1/1998  (JP) .

* cited by examiner

Primary Examiner—Kim Vu
Assistant Examiner—Jean M. Corrielus
(74) Attorney, Agent, or Firm—Wenderoth, Lind & Ponack, L.L.P.

(57) ABSTRACT

In a file distribution system, an information management unit (10) receives information of a data file version of a target terminal (2) together with information of the hardware type of the terminal (2) and directly references thereto, thereby deciding the file version and hardware type of the terminal, and a file extracting unit (11) selectively extracts a referenced distribution file from the distribution file based on the decision result made by the information management unit (10), and the reference versions of the distribution files together with hardware type information of the terminal are installed in the distribution side without installing the information of the file versions of the terminal.

11 Claims, 7 Drawing Sheets

Fig.3

| H/W ID (Word) | DATA LENGTH (Byte) | DATA ARRAY |

Fig.4

| H/W ID | DATA LENGTH | DATA ARRAY |
|---|---|---|
| 0001 (CPU) | 10 | "MMX 266Mhz" |
| 0002 (Mem) | 4 | 0032 (32MB) |
| 0003 (HDD) | 4 | 2100 (2.1G) |
| ⋮ | ⋮ | ⋮ |

Fig.5

| DISTRIBUTION FILE | VERSION INFO. LENGTH | VERSION INFO. |
|---|---|---|
| H/W ID1 (Word) | DATA LENGTH1 (Byte) | DATA ARRAY1 |
| H/W ID2 (Word) | DATA LENGTH2 (Byte) | DATA ARRAY2 |
| H/W ID3 (Word) | DATA LENGTH3 (Byte) | DATA ARRAY3 |
| ⋮ | ⋮ | ⋮ |

Fig.6

| 0001 (Appli. A) | 7 | V1.0L10 |
|---|---|---|
| 0002 (Mem) | 4 | 0020 (32MB) |
| 0010 (CD-ROM) | 4 | 0010 (16times speed) |
| ⋮ | ⋮ | ⋮ |

Fig.7A

| DISTRIBUTION FILE ID (DWord) | H/W ID (Word) | DATA LENGTH (Byte) | DATA ARRAY |
|---|---|---|---|

Fig.7B

| 00000001 | 0001 (WORD PRO. SOFT A) | 7 | V1.0L10 |
|---|---|---|---|
| | 0002 (MEM) | 4 | 0032 (32MB) |
| | 0003 (HDD) | 4 | 2100 (2.1G) |
| | 0004 (CD-ROM) | 4 | 0032 (32 times speed) |

Fig.7C

| 00000002 | 0002 (TABLE CAL. SOFT B) | 7 | V1.10L11 |
|---|---|---|---|
| | 0002 (MEM) | 4 | 0064 (64MB) |
| | 0003 (HDD) | 4 | 8400 (8.4G) |

Fig.7D

| 00000003 | 0003 (DESK-TOP CAL. SOFT C) | 7 | V1.10L11 |
|---|---|---|---|

FILE DISTRIBUTION SYSTEM AND METHOD THEREOF

BACKGROUND OF THE INVENTION

1. Field of the Invention

The present invention relates to a file distribution system and method thereof, including a function of a host computer in connection with one or more terminals, for distributing data files to the terminals under management of versions of program applications and data files for use in operating the terminals.

2. Description of the Prior Art

In conventional version up systems for updating program version numbers of data files or applications using networks, there has been used a file distribution system in which copying operations of data files are performed as many times as corresponding to the number of individual terminals and the copied data files are installed to thereby change the old data files and applications into those of new versions in the terminals. Also, there has been used another type of distribution system in which a host computer connected with terminals or an intermediate computer interposed between the host computer and each terminal connected therewith is installed with version management information relating to each terminal and with new data or applications of new versions, so that, based on the version management information, new data files or applications are distributed to a desired terminal requiring a version-up process.

Meanwhile, in the case where only one computer is used, when there is caused a defect due to a hardware or a serious difficulty or trouble such that a system per se is destroyed, the system corresponding to the hardware type thereof must be reinstalled with data files from the initial stage.

FIG. 9 shows an example of a conventional construction of a file distribution system. In this construction, a host computer 100 is connected to a terminal 300 via an intermediate computer 200 interposed between the host computer 100 and the terminal 300. Otherwise, the host computer 100 may be directly connected to the terminal 300 without using an intermediate computer. The host computer 100 includes a version management portion 101 for managing a program version of a subordinate station and a distribution file storage portion 102 for storing a distribution data file to be distributed to a desired subordinate station.

The intermediate computer 200 includes a version management portion 201 managing a program version of the terminal, distribution file storage portion 202 for storing a distribution data file to be distributed to a desired terminal, a version memory portion 203 for storing a program version of the intermediate computer 200 per se, and a file memory portion 204. The terminal 300 includes a version management portion 301 for managing a program version of the terminal per se and a version memory portion 302 for memorizing the program version of the terminal 300 per se.

In the case where the host computer 100 is directly connected to the terminal 300 without using an intermediate computer, the program version of the terminal 300 is informed to the version management portion 101 of the host computer 100 at the timing of a start of the communication between the host computer 100 and the terminal 300. Then, in the host computer 100, the informed version of the terminal is compared with the version of the terminal 300 stored by the version management portion 101. When the informed version is not coincident with the managed one stored in the version management portion 101, a version-up file is distributed from the distribution file storage portion 102 of the host computer 100 to the terminal 300. In the terminal 300 distributed with the version-up file, the distributed version-up file is stored in the version management portion 301 to update the old version of the version memory portion 302 in the terminal 300.

Similarly, in the case where the intermediate computer 200 is interposed between the host computer 100 and the terminal 300, the terminal version is compared with the version of the terminal 300 managed by the terminal version management portion 201 in the intermediate computer 200. When the informed terminal version is not coincident with the managed one, a version-up file is distributed from the intermediate computer 200 to the terminal 300.

In the conventional file distribution system, however, it is essentially necessary that the information of the program versions of all of the terminals should be held not only in each terminal but also in the host computer and/or intermediate computer Accordingly, as the number of the terminals is increased, the information of the version management of the terminals to be stored in the version management portions 101 and/or 201 of the host and intermediate computers is increased in amount in proportion thereto, which is wasteful of resources.

Moreover, since the number of hardware types of the terminals is generally by far smaller than the number of the terminals connected to the network system, therefore the information of the versions of the terminals are mostly overlapped.

Furthermore, the performance of each terminal is remarkably improved in a short time recently, and accordingly the applications to be installed in each terminal are increased in function and the process thereof tends to be more and more complicated. Therefore, there has been a problem that, even if the same data file is treated, when applications are successively updated, some performance of the terminals can not be used for the newly updated function thereof, otherwise, although the data file of the application of the old version can be used for the newly updated version, the data file of the application of the new version can not be used for the old version application.

SUMMARY OF THE INVENTION

The present invention has been developed with a view towards substantially solving the above described disadvantages. Accordingly, an essential objective of the present invention is therefore to provide a novel file distribution system of a simple construction in which data file versions of each terminal and information of types in hardware of the terminals are directly referenced by a host computer so that a version-up file is distributed only to a terminal requiring the version up. Moreover, the distribution files are ranked in level so that, with regard to the lower ranked files in version up, each terminal side is authorized to determine whether or not the version-up file is to be distributed from the host computer to the terminal.

In order to achieve the above objective, according to an aspect of the present invention, a file distribution system is provided which is a combination of a file distribution device and a plurality of terminals subordinately interconnected thereto, the file distribution device comprises:

management means for receiving information of data file version of a target terminal together with information of hardware type of the terminal transmitted from the terminal and directly referencing thereto, thereby deciding the file version and hardware type of the terminal;

storage means for storing distribution files to be distributed to the terminal when requiring a version up thereof; and file extracting means for selectively extracting a referenced distribution file from the distribution file storage means, based on the decision result made by the management means.

The file distribution device further includes database means for storing reference versions of the distribution files together with hardware type information of the terminal, without installing the information of the file versions of the terminals in the file distribution device.

The file distribution device further includes rank information storage means for storing rank information of the distribution files and ranking the distribution files in levels.

In another aspect of the present invention, adapted to the case where the distribution data file is dependent on the versions of applications, the file distribution device further includes a data conversion means connected to the file extracting means for converting the distribution file to a data file having a version corresponding to a target application version.

In another aspect of the present invention, a file distribution method for distributing a file from a file distribution side to a file receiving side, comprises:

searching information of the version data and hardware type information, upon receipt of the version data and hardware type information from the file receiving side;

judging whether or not the file to be distributed exists in the file distribution side;

deciding the kind of the terminal in hardware and file version of the file receiving side;

judging, based on the decision result made by the deciding step, whether or not there exists a file to be distributed to the file receiving side; and extracting a desired distribution file with reference to the hardware type and version management information, based on the version data transmitted from the file receiving side.

By this arrangement, the file distribution device is adapted to obtain information of a data file version of each terminal every distribution process, and therefore it is not needed for the file distribution device to store the file versions of all the terminals, increasing efficient usage of resources.

Moreover, in the present invention, the distribution decision of a file is given to a terminal per se, and the data file is converted to a data file having a version coincident with the application version of the target terminal, and accordingly, wasteful file distribution can be avoided to thereby attain an efficient file distribution.

BRIEF DESCRIPTION OF THE DRAWINGS

These and other objects and features of the present invention will become clear from the following description taken in conjunction with the preferred embodiments thereof with reference to the accompanying drawings, in which:

FIG. 3 is a model view showing a data structure of information used in the present invention;

FIG. 4 is an example of the data structure shown in FIG. 3;

FIG. 5 is a mode view showing a data structure of information used in the present invention;

FIG. 6 is an example of the data structure shown in FIG. 5;

FIG. 7A is a practical data structure of information used in the present invention;

FIGS. 7B, 7C and 7D are examples of the data structure shown in FIG. 7A;

DETAILED DESCRIPTION OF THE PREFERRED EMBODIMENT

Figure 1:
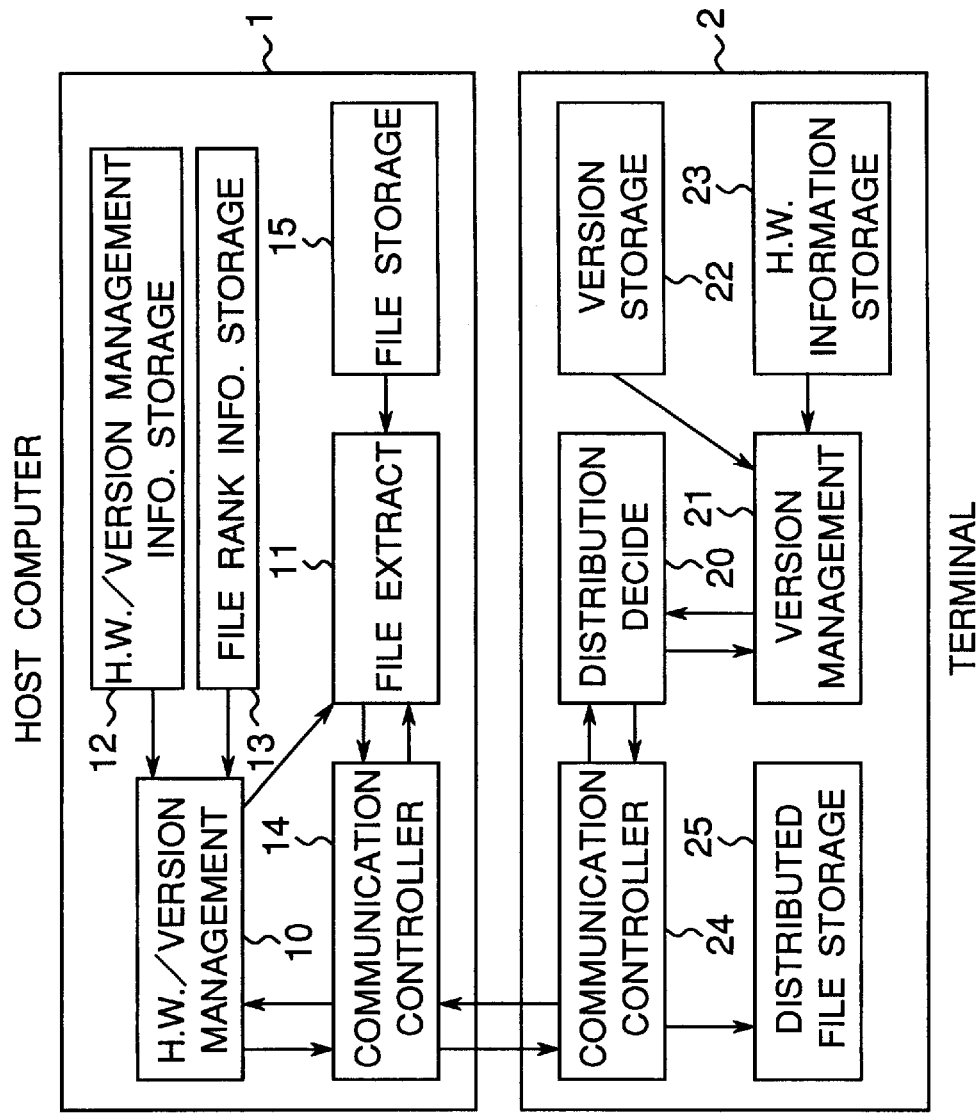
FIG. 1 is a block diagram showing a schematic construction of the first embodiment according to the present invention.

Before the description proceeds, it is noted that, since the basic structure of the preferred embodiments is similar to that of the conventional one, like parts are designated by the same reference numerals throughout the accompanying drawings.

A preferred embodiment of the present invention is described below with reference to FIGS. 1 through 8.

FIG. 1 shows a schematic construction of a file distribution system according to a first embodiment of the present invention. In this construction, reference numeral 1 denotes a host computer serving as a file distribution apparatus in a communication network system, and 2 denotes one of a plurality of terminals subordinately connected to the host computer 1 for receiving a version-up file distributed from the host computer. The host computer 1 includes a hardware type (H.W.)/version management unit 10 for obtaining a version of a program installed in the terminal together with information of hardware type or kind of the terminal to thereby decide and manage the kind or type of the hardware (referred to as "H.W." hereinafter) of each terminal and data file version of the terminal. The host computer 1 further includes a file extracting unit 11 for extracting a distribution file stored in a distribution file storage unit 15, based on the decision result of the hardware type or kind and data file version of the terminal made by the management unit 10. The host computer 1 includes a H.W./version management information storage unit 12 for storing management information of the kind or type of hardware together with file version of the terminal, and further includes a rank information storage unit 13 for storing the distribution file rank information. This hardware type (H.W.) information and version information are stored as a database in a look-up-table manner.

The terminal 2 includes a distribution deciding unit 20 for deciding whether a version-up file is to be distributed from the host computer or not and requesting a version-up file to the host computer 1 when necessary. The terminal 2 further includes a version management unit 21 for managing the program version of the file and H.W. information of the terminal, a version storage unit 22 for storing information of the program version of the file, and a H.W. information storage unit 23 for storing the H.W. information of the terminal. The version management unit 21 takes and manages the program version data stored in the version storage unit 22 and the H.W. information of the terminal stored in the H.W. information storage unit 23 and feeds this information to the distribution deciding unit 20.

In response to the request from the distribution deciding unit 20, the version management unit 21 obtains the version data from the version storage unit 22 and the hardware type (H.W.) information from the H.W. information storage unit 23 and sends this information to the distribution deciding unit 20. In the distribution deciding unit 20, it is inquired to the user of the terminal 2 whether or not the distribution of the version-up file is to be requested. Otherwise, the distribution deciding unit 20 obtains the version data from the version storage unit 22 and H.W. information from the H.W. information storage unit 23 via the version management unit 21 to thereby decide whether or not the distribution of the version-up file is requested to the host computer with respect to the obtained version and H.W. information.

The host computer 1 and terminal 2 both include communication controller units 14 and 24, respectively, and the communication between the host computer 1 and the terminal 2 is performed via the communication controller units 14 and 24.

In the host computer 1, it is noted that the method of storing the distribution file in the file storage unit 15 is known in the art as a file managing method of a file of such as a tree structure in a general windows machine.

In this distribution system, each piece of information data treated therein has a basic data structure having regions of information ID, data length and data array arranged in this order, each piece having at most 256 bytes in length. Each terminal treats the version information including plural pieces of the above information data structure.

The following describes the data structures of the information treated in the host computer and each terminal.

In each terminal, the hardware type (H/W) information has a basic data structure as shown in FIG. 3, where the number of IDs corresponds to the kinds of the hardware and the IDs are used differently for the types such as CPU, HDD, CD-ROM and the like, and each terminal has its own H/W information as shown in FIG. 4, for example.

The version information has a distribution file ID (D Word) pattern and each terminal has plural pieces of the patterns whose number corresponds to the kinds of the distributed files. The actual version information is held in the host computer and the terminal is not required to append the distribution file ID to the actual version information. If the versions are different even in the same file, the distribution file Ids thereof are different from each other.

In the host computer, the data structure of the information is generally similar to that treated in the terminal.

The basic format of the hardware type and version management information stored in the H.W./version storage unit 12 is shown in FIG. 5, which includes a distribution file ID (D Word), version information length in byte and version information of data array each having a corresponding data length.

FIG. 6 shows an example of the hardware type and version management information in case of using Application A, Memory and CD-ROM as a distribution file.

In a preferred embodiment, FIG. 7A shows a practical basic structure of the H.W./version management information, which includes a distribution file ID (D Word), H/W ID (Word), Data length (Byte) and Data array corresponding to the data length, and FIGS. 7B, 7C and 7D show examples of using a word processor soft A, table calculation soft B and desk-top calculation soft A, respectively. Thus, the H.W./version management information includes information of a file to be distributed and hardware type (H/W) information needed for the file to be distributed. In the case where the file to be distributed is irrespective of the kinds of hardware as shown in FIG. 7D, the management information does not have a region of hardware type (H/W) information.

Similarly, the distribution file rank information stored in the file rank information storage unit 13 has a data structure composed of a distribution file ID (D Word) and rank information (byte) indicating the rank thereof where the rank is represented by numbers of e.g. 0, 1, 2, . . . , where the starting number "0" indicates forcible distribution in such a case of correcting, for example, 9 serious defect and the rank number increases as the degree of distribution priority is degraded.

Figure 2A:
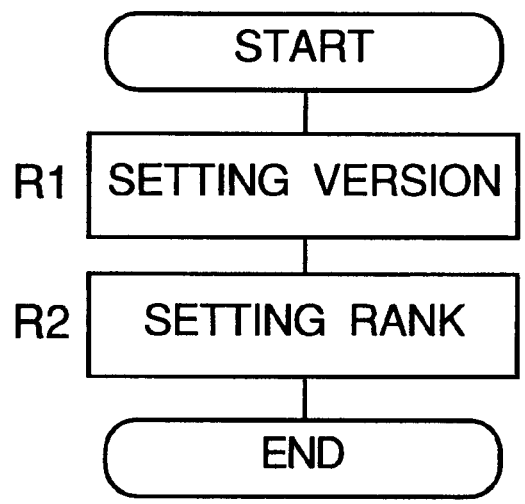
FIGS. 2A and 2B are flow charts for explaining an operation of the first embodiment.
Figure 2B:
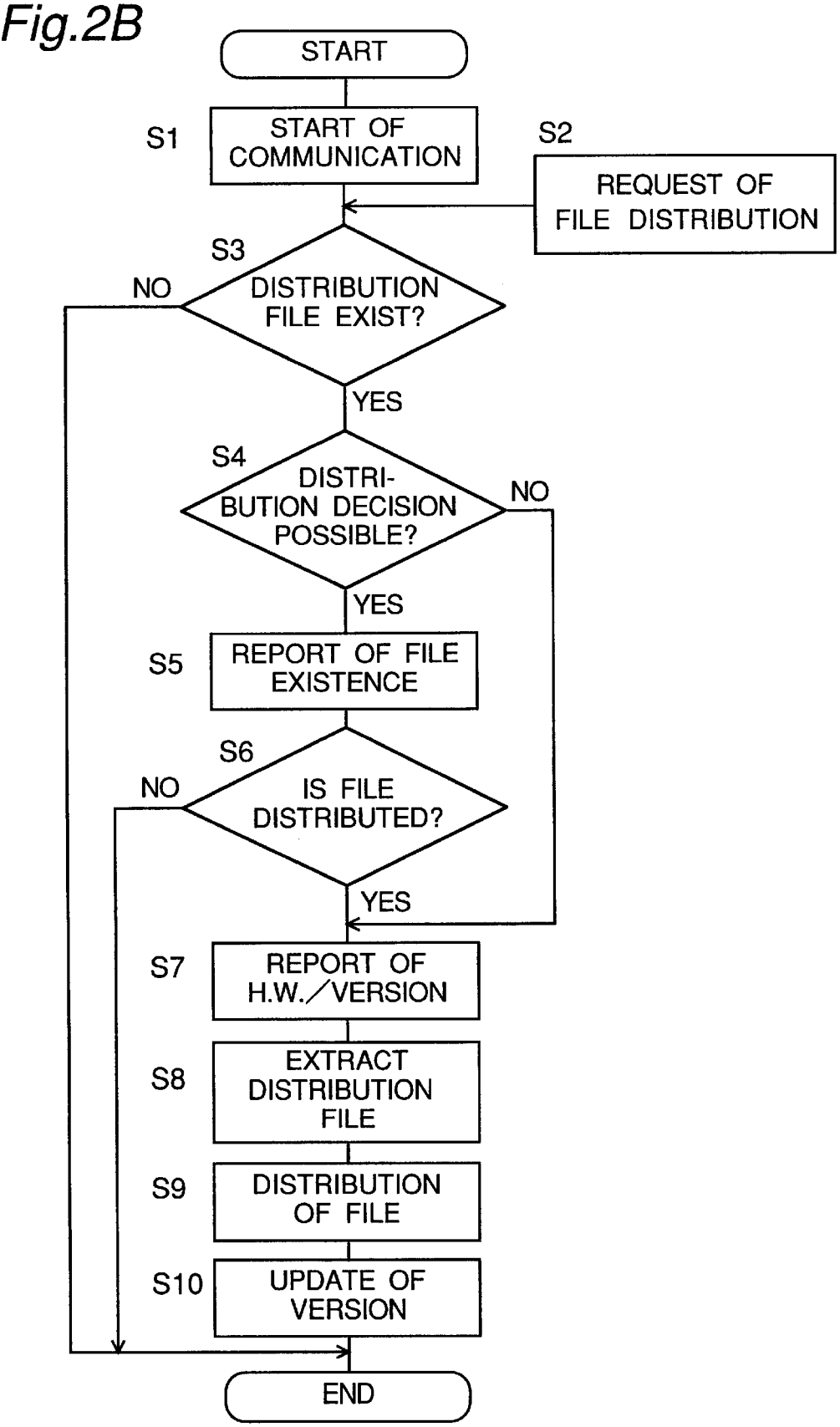

The following describes an operation of the file distribution system of the first embodiment with reference to FIGS. 2A and 2B.

FIG. 2A shows a process of setting a program version of a new distribution file and a rank information thereof. When a new distribution file is installed in the host computer 1, the version of the new distribution file is settled as the version management information and stored in the H.W./version management information storage unit 12, in step R1. Meanwhile, the rank information of the new distribution file is settled as the distribution file rank information and stored in the rank information storage unit 13, in step R2. The distribution file rank information is classified into several ranks in the distribution side of the host computer in accordance with the contents thereof e.g. from a serious difficulty level to a merely function-up level.

As shown in FIG. 2B, when the communication is started between the host computer 1 and the terminal 2, the file distribution is started at the same time, in step S1. In the case where the process is now under communication, the distribution is started when a request for file distribution is transmitted from the terminal 2 to the host computer 1, in step S2.

Subsequently, in the H.W./version management unit 10, upon receipt of the version data represented by a distribution file ID read out of the version storage unit 22 and the hardware type (H/W) information read out of the H.W. information storage unit 23, the H.W./version management unit 10 searches these received information of the version data and the H/W information among the H/W and version management information stored in the H.W./version management storage unit 12, and judges whether or not the file to be distributed exists therein, in step S3. Thus, the H.W./version management unit 10 decides the kind or type of the terminal in hardware and data file version of the terminal, and the host computer 1 judges based on the decision result made by the H.W./version management unit 10 whether or not there exists a file to be distributed to the terminal.

When there exists no file to be distributed, the distribution process is ended. When there exists a file to be distributed, the H.W./version management unit 10 obtains a corresponding rank information of the outstanding file from the file rank information stored in the file rank storage unit 13 and judges whether or not the decision of the file distribution can be authorized to the terminal side, in step S4. When the file is important and the distribution decision thereof can not be performed by the terminal side, the process goes to step S7.

When it is judged in step S4 that the distribution can be perfromed by the terminal side, the H.W./version management unit 10 informs the terminal 2 in step S5 that there exists a file to be distributed.

Subsequently, in step S6, it is decided by the distribution deciding unit 20 in the terminal 2 whether or not the file is to be distributed by for example asking the user, or based on the information obtained from the version storage unit 22 and H/W information storage unit 23 via the version management unit 21, and the decision result is transmitted to the host computer 1. When it is judged in step S6 that the file is not to be distributed, the distribution process is ended. When it is judged in step S6 that the file is to be distributed, the terminal 2 informs the host computer 1 of the current version data stored in the version storage unit 22 and H/W information stored in the H.W. information storage unit 23, in step S7.

Subsequently, in step S8, the file extracting unit 11 extracts a desired distribution file from the file storage unit 15 with reference to the H.W./version management information stored in the storage unit 12, based on the version data transmitted from the version storage unit 22 and H/W information transmitted from the H.W. information storage unit 23 informed from the terminal 2 to the host computer 1.

Then the version-up file is distributed from the host computer 1 to the terminal 2 in step S9. Thus, the distributed file is stored in the file storage unit 25 and the version management unit 21 updates the program version of the version storage unit 22 with the distributed file version in step S10.

Thus, in the first embodiment, information of data file version of each terminal together with information of the hardware type of the terminal is directly referenced by a host computer, so that the distribution file is distributed to only the terminal requiring a version up thereof. Moreover, by ranking the distribution file in levels by means of the file rank storage unit 13, when there is no problem even without version up of a data file, the performance of file distribution can be decided by the terminal side and the terminal is all the time allowed to request for the file distribution. Moreover, the host computer 1 is required to install only the version of the distribution file and hardware type (H/W) information of each of the terminals, and therefore it is not necessary to install the version of data file of all the terminals, resulting in a reduction of wasted resources.

Figure 8:
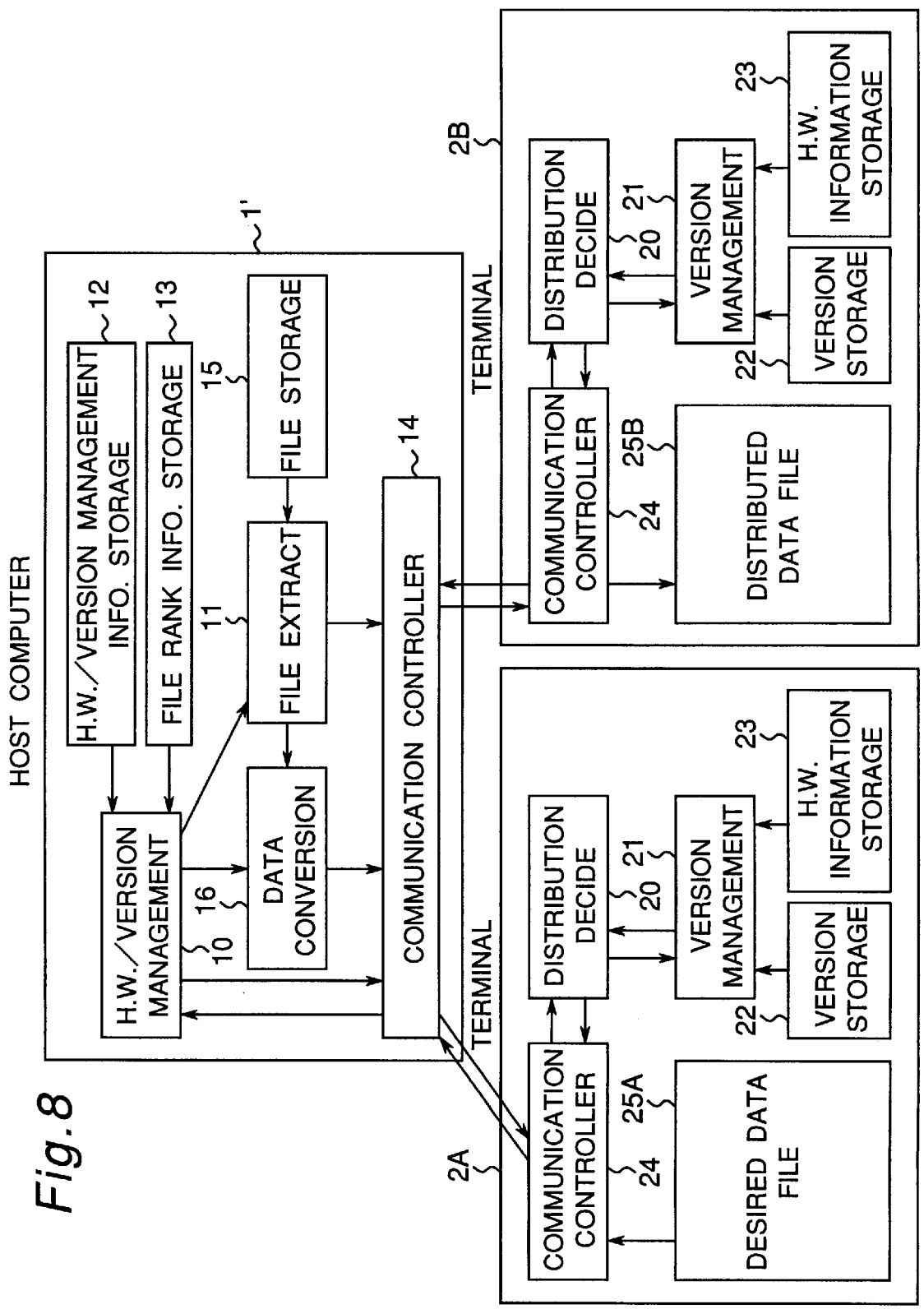
FIG. 8 is a block diagram showing a schematic construction of the second embodiment according the present invention.
Figure 9:
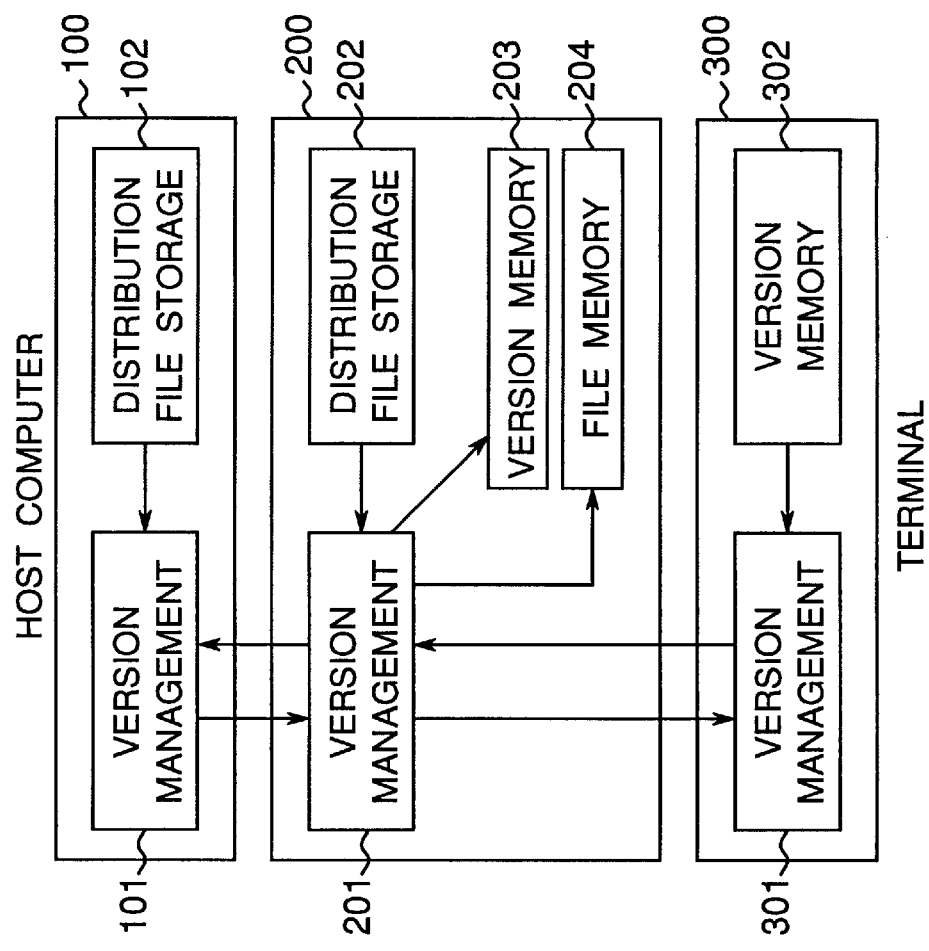
FIG. 9 is a block diagram showing a conventional file distribution system.

FIG. 8 shows a schematic construction of a file distribution system according to a second embodiment of the present invention. In this embodiment, two or more parallel terminals 2A and 2B are connected to a host computer 1' and the construction of the host computer 1' is similar to that of the first embodiment except for providing a data conversion unit 16 therein, and therefore the explanation on the redundant portions is omitted here for brevity.

The data conversion unit 16 is interposed between the file extracting unit 11 and the communication controller unit 14 for converting a distribution file to a data file of a corresponding target version, which the system is adapted to the case where the distribution data file is dependent on the versions of applications. When a data file stored in a file storage unit 25A of the first terminal 2A is desired to be distributed to the file storage unit 25B of the second terminal 2B, the versions of the applications for treating with the data files in the terminals 2A and 2B are reported to the host computer via the version management units 21, respectively. When the informed versions are different from each other, the distribution data file is converted to a data file of a target application version by means of the data conversion unit 16 and then the converted data file is distributed from the terminal 2A to the terminal 2B via the host computer.

Thus, in the second embodiment, the distribution file is converted to a data file of a version in accordance with the target application version of a terminal and thereafter the converted data file is distributed to the target terminal. In this construction, in the case where the data files are different in accordance with the versions of applications using, for example a document file and the like, even when a data file of old application version is installed in the host computer, the distribution data file is converted to that of the target version to be usable therein. Therefore, even when applications are successively updated in using the same data file, any performance of the terminals can be used for the newly updated function thereof, and the data file of the application of the new version can also be used for the old version application and vice versa.

It is noted here that, although the file distribution system is accomplished by using a host computer in connection with terminals in the present embodiments, the file distribution can be easily accomplished even in a standing-alone type terminal, without using a host computer, by using a transportable mass storage memory such as, for example, a CD-ROM storing a file distribution program and distribution files for realizing a host computer function by software of computer program in each terminal.

As described above, in the file distribution system according to the present invention, a file distribution device such as a host computer is adapted to obtain information of a data file version of each terminal every distribution process, and therefore it is not needed for the file distribution apparatus to store the file versions of all the terminals, increasing efficient usage of resources.

Moreover, in the present invention, the distribution decision of a file is given to a terminal per se, and the data file is converted to a data file having a version coincident with the application version of the target terminal, and accordingly, wasted file distribution can be avoided to thereby attain an efficient file distribution.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A file distribution system comprising:
   a file distribution device and a plurality of terminals, wherein said plurality of terminals are subordinately interconnected to said file distribution device;
   said file distribution device comprising:
      a type/version management unit operable to receive information of a data file version of a terminal together with information of a hardware type of said terminal transmitted from said terminal and directly referencing thereto, thereby deciding the file version and the hardware type of said terminal;
      a file storage unit operable to store distribution files to be distributed to said terminal when requiring a version up thereof;
      a rank information storage unit operable to store rank information of the distribution files and to rank the distribution files in levels, wherein the distribution file rank information stored in the rank information storage unit has a data structure composed of a distribution file ID and rank information indicating a degree of significance of a distribution file; and
      a file extracting unit operable to selectively extract a referenced distribution file from the distribution files stored in said file storage unit based on the decision result made by said type/version management unit.

2. A file distribution system as claimed in claim 1, wherein said file distribution device further comprises a database operable to store reference versions of the distribution files together with hardware type information of said terminal, without installing the information of the file versions of said terminals in said file distribution device.

3. A file distribution system as claimed in claim 1, wherein said file distribution device further comprises a data conversion unit connected to said file extracting unit operable to convert the distribution file to a data file having a version corresponding to a target application version, adapted to a case where the distribution data file is dependent on the versions of applications.

4. A file distribution system as claimed in claim 1, where each of said terminals comprises a distribution deciding unit operable to decide whether or not a version-up file is to be distributed.

5. A file distribution system as claimed in claim 4, wherein each of said terminals further comprises a version management unit operable to manage the hardware type and version information of said terminals per se.

6. A file distribution system as claimed in claim 4, wherein each of said terminals further comprises a version storage unit operable to store information of the version of the file, and further comprises a hardware type information storage unit operable to store the information of the type of hardware of said terminal.

7. A file distribution system as claimed in claim 1, wherein the file rank information is information indicative of a degree of significance of a distribution file, and in the case where the degree thereof is most significant, a reception of the distribution file cannot be refused by a receiving terminal side.

8. A file distribution system as claimed in claim 1, wherein the rank information comprises a rank number which is varied in accordance with a degree of distribution priority.

9. A file distribution method for distributing a file from a file distribution side to a file receiving side, said file distribution method comprising:

searching information of version data and hardware type information upon receipt of the version data and hardware type information from the file receiving side;

judging whether or not the file to be distributed exists in the file distribution side;

deciding a kind of hardware of a terminal and a file version of the file receiving side;

judging, based on the decision result made by said deciding, whether or not there exists a file to be distributed to the file receiving side;

obtaining a corresponding rank of the outstanding file from file rank information stored at the file distribution side, wherein the distribution file rank information stored at the file distribution side has a data structure composed of a distribution file ID and rank information indicating a degree of significance of a distribution file;

judging whether or not the decision of the file distribution can be performed by the file receiving side;

informing the file receiving side that there exists a file to be distributed; and extracting a desired distribution file with reference to the hardware type and version management information based on the version data transmitted from the file receiving side.

10. A file distribution method as claimed in claim 9, wherein the file rank information is information indicative of a degree of significance of a distribution file, and in the case where the degree thereof is most significant, a reception of the distribution file cannot be refused by a receiving terminal side.

11. A file distribution method as claimed in claim 9, wherein the rank information comprises a rank number which is varied in accordance with a degree of distribution priority.

* * * * *